(12) United States Patent
D'Ausilio et al.

(10) Patent No.: US 7,070,151 B2
(45) Date of Patent: *Jul. 4, 2006

(54) IN ORBIT SPACE TRANSPORTATION AND RECOVERY SYSTEM

(75) Inventors: Robert F. D'Ausilio, Bountiful, UT (US); Roger X. Lenard, Edgewood, NM (US); Chauncey W. Uphoff, Longmont, CO (US); Franklin H. Williams, Jr., Salt Lake City, UT (US)

(73) Assignee: IOSTAR Corporation, North Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/755,200

(22) Filed: Jan. 9, 2004

(65) Prior Publication Data

US 2005/0151022 A1   Jul. 14, 2005

(51) Int. Cl.
  *B64G 1/10*   (2006.01)
  *B64G 1/40*   (2006.01)
  *B64G 1/64*   (2006.01)
  *B64G 1/54*   (2006.01)

(52) U.S. Cl. ............... 244/171.1; 244/172.4; 244/171.7; 244/172.2

(58) Field of Classification Search ............ 244/158 R, 244/172, 173
See application file for complete search history.

(56) References Cited

U.S. PATENT DOCUMENTS

| | | | |
|---|---|---|---|
| RE27,903 E | 1/1974 | Fogarty | |
| 3,825,211 A | 7/1974 | Minovitch | |
| 4,471,926 A | 9/1984 | Steel, III | |
| 4,575,029 A | 3/1986 | Harwood et al. | |
| 4,664,344 A | 5/1987 | Harwell et al. | |
| 4,718,709 A | 1/1988 | Myers et al. | |
| 4,750,692 A | 6/1988 | Howard | |
| 4,754,601 A | 7/1988 | Minovitch | |
| 4,943,014 A | 7/1990 | Harwood et al. | |
| 5,260,639 A | 11/1993 | De Young et al. | |
| 5,294,079 A | 3/1994 | Draznin et al. | |

(Continued)

FOREIGN PATENT DOCUMENTS

RU    2 040 445 C1    7/1995

OTHER PUBLICATIONS

EL Genk A Critical Review of Space Nuclear Power and Propulsion.

(Continued)

*Primary Examiner*—Robert P. Swiatek
(74) *Attorney, Agent, or Firm*—Thomas N. Giaccherini; Mark P. Stone

(57) ABSTRACT

An In Orbit Transportation & Recovery System (IOSTAR™) (10) One preferred embodiment of the present invention comprises a space tug powered by a nuclear reactor (19). The IOSTAR™ includes a collapsible boom (11) connected at one end to a propellant tank (13) which stores fuel for an electric propulsion system (12). This end of the boom (11) is equipped with docking hardware (14) that is able to grasp and hold a satellite (15) and as a means to refill the tank (13). Radiator panels (16) mounted on the boom (11) dissipate heat from the reactor (19). A radiation shield (20) is situated next to the reactor (19) to protect the satellite payload (15) at the far end of the boom (11). The IOSTAR™ (10) will be capable of accomplishing rendezvous and docking maneuvers which will enable it to move spacecraft between a low Earth parking orbit and positions in higher orbits or to other locations in our Solar System.

21 Claims, 17 Drawing Sheets

U.S. PATENT DOCUMENTS

| | | | |
|---|---|---|---|
| 5,320,395 | A | 6/1994 | Gemhardt et al. |
| 5,779,195 | A | 7/1998 | Basuthakur |
| 6,017,000 | A | 1/2000 | Scott |
| 6,213,700 | B1 | 4/2001 | Everard |
| 6,330,987 | B1 * | 12/2001 | Scott ...................... 244/158 R |
| 6,357,700 | B1 | 3/2002 | Provitola |
| 6,364,252 | B1 | 4/2002 | Anderman |
| 6,478,257 | B1 | 11/2002 | Oh et al. |
| 6,669,148 | B1 | 12/2003 | Anderman et al. |

OTHER PUBLICATIONS

Barnett Nuclear Electric Propulsion.
JPL SP-100 Technical Summary Report—vol. 1—Executive Summary.
Olin Small Upper Stage.
Topaz II Proves to be a Gem for International Tech Transfer.
Litchford Prospects for Nuclear Electric Propulsion.
Collins Small Orbit Transfer Vehicle.
Hord CRC Handbook of Space Technology: Status and Projections.
Cohen The Grand Challenge: A New Plasma Thruster.
General Electric and NASA—Leaders in Space Technology.
TRW—A Low Cost Premium Performance OMV.
Lenard Insterstellar Rendezvous . . . .
Lenard Recent Progress . . . .
Godfroy Realistic Development . . . .
Lenard Technology Needs . . . .
Lipinski A Gas-Cooled Reactor . . . .
Lipinski Small Fission Power Systems for NEP.
Lipinski Small Fission Power Systems for Mars.
Lipinski NEP for a Kuiper Belt Object . . . .
Lipinski Fission-Based Electric Propulsion . . . .
Lenard Power System Requirements.
Lipinski A Fission-Powered Interstellar Precursor Mission.
Lenard Fission Electric Propulsion with MagSail . . . .
Lenard Technical Aspects . . . (Abstract Only—Paper Never Published).
Ortiz A Cost Analysis . . . .
Earley Reusable Space Tug Concepts.
Martin Nuclear Electric Propulsion of Spacecraft.
Jaffe Nuclear-Electric Reuseable . . . .
Lenard Nuclear Electric Propulsion for Enhanced Mars Sample Return Missions.
Schall Laser Radiation for Cleaning Space Debris . . . .
El-Genk Space Nuclear Power Systems.
Bruno Building Roadmaps . . . .
Deininger Arcjet Propulsion.
Shepherd Performance Criteria.
Loeb A Nuclear-Electric Propulsion Module for Advance Solar System Exploration . . . .
Barnett Nuclear Electric Propulasion.

* cited by examiner

Service Vehicle

Launch Vehicle Shroud 24

Launch Vehicle Shroud 24

Overview of Brayton System

Current National Space Architecture
Satellite launched to GSO: 7-10 hours to orbit IOSTAR Space Architecture
45-65 days to orbit

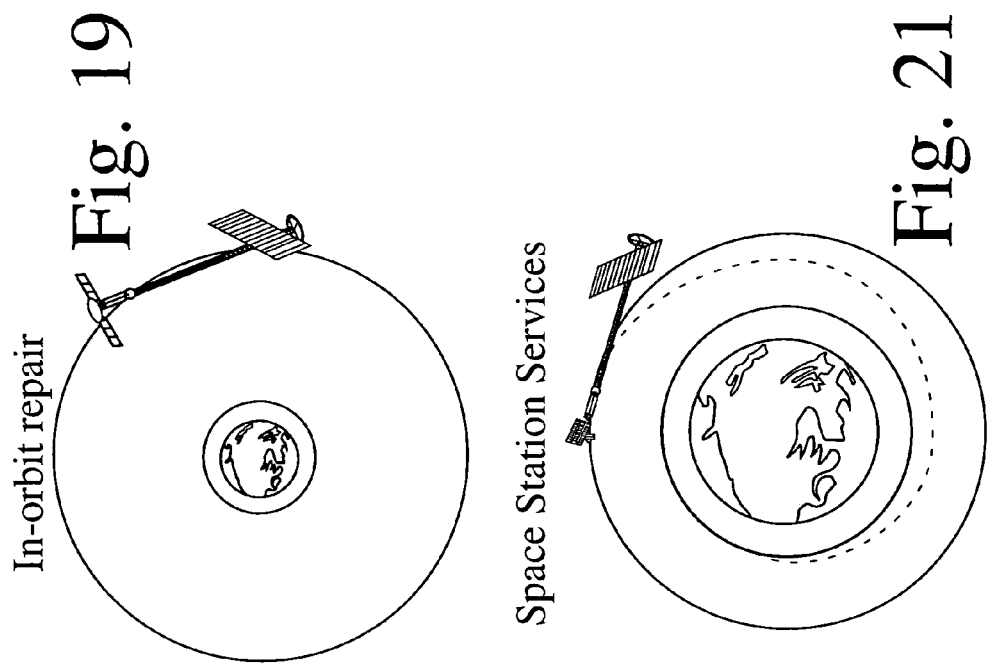
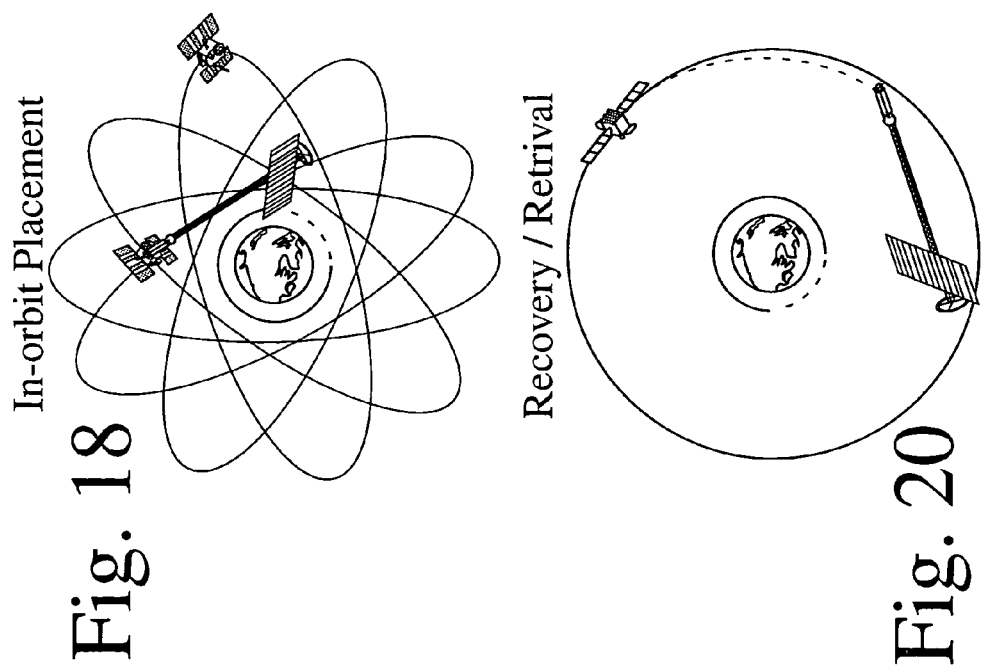

IN ORBIT SPACE TRANSPORTATION AND RECOVERY SYSTEM

CROSS-REFERENCE TO RELATED PENDING PATENT APPLICATIONS & CLAIMS FOR PRIORITY

The Present Patent Application is a Non-Provisional, Continuation-in-Part Patent Application. The Applicants claim the benefit of priority under Sections 119 & 120 for any subject matter which is commonly disclosed in the Present Application and in:

Pending PCT International Patent Application ITS9601-CIPB-PCT, PCT/US03/32748; filed on 10 Nov. 2003;
Pending Application ITS9601CIPB, U.S. Ser. No. 10/736,887, filed on 15 Dec. 2003;
Pending Application ITS9601CIPA, U.S. Ser. No. 10/298,138, filed on 15 Nov. 2002; and
Abandoned Parent Application ITS9601, U.S. Ser. No. 09/918,705, filed on 30 Jul. 2001.

FIELD OF THE INVENTION

The present invention relates to the field of spacecraft and satellites. More particularly, this invention provides a transportation and rescue system for moving objects in space between low Earth orbits, higher orbits and beyond.

FEDERALLY SPONSORED RESEARCH OR DEVELOPMENT

None.

BACKGROUND OF THE INVENTION

Hundreds of man-made satellites are currently in orbit around the Earth. Over the next decade, governments and companies around the globe plan to launch hundreds of new spacecraft for a variety of communications, defense and remote sensing projects. The placement of satellites into Earth orbit can cost many millions of dollars. A conventional launch involves a large multi-stage, single-use rocket to lift a satellite into a geosynchronous orbit.

A general description of conventional nuclear-propulsion systems may be found in a text entitled A Critical Review of Space Nuclear Power and Propulsion, edited by Mohamed S. El-Genk, which was published by the American Institute of Physics in 1994.

The U.S. Departments of Energy and Defense and NASA developed plans for a Generic Flight System for space-based defense systems and NASA exploration missions called SP-100 in the mid-1980's. The SP-100 was designed to supply nuclear-power for military and civilian space systems. This early system was designed as a single-use power stage for a single, permanently attached payload; and was never configured for any on-orbit rendezvous, docking or servicing missions. The SP-100 is described in the SP-100 Technical Summary Report, which was prepared for the U.S. Department of Energy by the Jet Propulsion Laboratory and the California Institute of Technology in September, 1994.

Various nuclear electric propulsion systems are described in a publication entitled Nuclear Electric Propulsion, A Summary of Concepts Submitted to the NASA/DoE/DoD Nuclear Electric Propulsion Workshop, which was held in Pasadena, Calif. on 19–22 Jun. 1990.

The Aerospace Division of the Olin Corporation proposed a small engine for the small satellite community called the Small Upper Stage (SUS). The SUS was designed to accomplish low Earth orbit transfers, orbit circularizations and plane changes using hydrazine propulsion.

TRW has patented several methods and apparatus intended for the space transportation market. In U.S. Pat. No. 4,471,926, Steel describes a Transfer Vehicle for Use in Conjunction with a Reusable Space Shuttle. This spacecraft has a propulsion system that uses a low-thrust bi-propellant liquid rocket engine to provide a soft, low-acceleration ascent. In U.S. Pat. No. 4,575,029, Harwood and Love disclose a spacecraft for transporting a payload from a space shuttle in a low altitude parking orbit to an operational orbit. In U.S. Pat. No. 4,943,014, Harwood and Love reveal their "soft ride" method for changing the altitude or position of a spacecraft in orbit using a liquid bi-propellant engine.

In U.S. Pat. No. 4,664,344, Harwell describes an apparatus and method of capturing an orbiting spacecraft. This device comprises a relatively small mechanical probe and fixture operated by an astronaut during a spacewalk.

In an article entitled Topaz Two Proves to Be a Gem for International Tech Transfer, contained in Technical Applications Report from Ballistic Missile Defense Organization, 1995, thermoionic reactors for space-based power generation are disclosed.

Prospects for Nuclear Electric Propulsion Using Closed-Cycle Magnetohydrodynamic Energy Conversion, by R. Litchford et al. was presented at the 12th Annual Advanced Space Propulsion Workshop in Huntsville, Ala. on 3–5 Apr. 2001.

J. Collins et al. disclose a Small Orbit Transfer Vehicle for On-Orbit Servicing and Resupply which was presented at the 15th Annual Utah State University Conference on Small Satellites at Logan, Utah, 13–16 Aug. 2001.

In U.S. Pat. No. 4,754,601, Minovitch discloses "a propulsion system for reusable space-based vehicles is presented wherein the propulsive working fluid is atmospheric gas."

In U.S. Pat. No. 5,260,639, De Young et al. describe "a method of supplying power to a device such as a lunar rover located on a planetary surface."

In U.S. Pat. No. 6,213,700, Koppel discloses a "method [which] serves to place a space vehicle, such as a satellite, on a target orbit such as the orbit adapted to normal operation of the space vehicle and starting from an elliptical initial orbit that is significantly different from, and in particular more eccentric than the target orbit."

In U.S. Pat. No. 6,357,700, Provitola describes "an spacecraft/airship, which uses buoyancy and thrusters to ascend into space with lifting gas as propellant or fuel for thrusters, which may be conventional thrusters or electric turbojets or ion thrusters."

In U.S. Pat. No. 5,260,639, Basuthakur et al reveal "a satellite assembly [that] is formed from any number of bus modules which have a substantially common shape and interior space volume."

In U.S. Pat. No. 6,478,257, Oh et al. describe "systems and methods that employ a phase change material to provide thermal control of electric propulsion devices."

In U.S. Pat. No. 3,825,211, Minovitch presents a "space vehicle [which] carries a vaporizable propellant . . . [E]nergy is transmitted to the vehicle while in space by a laser beam originating on the ground or some other body or satellite."

The development of an in-orbit space transportation and rescue vehicle would dramatically reduce the cost of changing the orbital position of a satellite. Such a system would revolutionize the military and commercial space industries, and fill a long-felt need in the telecommunications, direct-broadcast and remote-sensing industries.

SUMMARY OF THE INVENTION

The In Orbit Space Transportation & Recovery System (IOSTAR™) will revolutionize the commercial space industry by providing a lower cost alternative to conventional methods of moving spacecraft in orbit. Instead of using a multi-stage rocket powered by expensive and dangerous chemical fuels to lift a payload to a geosynchronous or geostationary orbit, the IOSTAR™ will rendezvous with a satellite waiting in a low Earth orbit, dock with the satellite and then gently transport it to an altitude of 22,300 miles using reliable nuclear-powered electric propulsion. The IOSTAR™ will also be available to relocate, rescue and/or retrieve satellites in need of repositioning or repair, and will be capable of ferrying objects to the Moon and to the neighboring planets of our Solar System.

One embodiment of the IOSTAR™ includes a collapsible boom with an attached deployable radiating surface, which expands to its fully extended position after reaching orbit. The boom is connected at one end to a tank which stores xenon which fuels ion propulsion engines located at the opposite end of the boom. Docking hardware which is capable of engaging a wide variety of objects in space is coupled to the farthest end of the boom near the fuel tank. A nuclear reactor, a radiation shield, an energy converter and a large array of heat-dissipating flat-panel radiators are mounted on the boom between the reactor and a payload grasping device. Plasma contactors, which include emitters and collectors are attached at either end of the boom and connected by a conductor.

An appreciation of the other aims and objectives of the present invention and a more complete and comprehensive understanding of this invention may be obtained by studying the following description of a preferred embodiment and by referring to the accompanying drawings.

A BRIEF DESCRIPTION OF THE DRAWINGS

FIGS. 1A & 1B present top and end views of one of the preferred embodiments of the In Orbit Space Transportation & Recovery System (IOSTAR™) vehicle in its fully deployed, orbital configuration.

Figure 4:
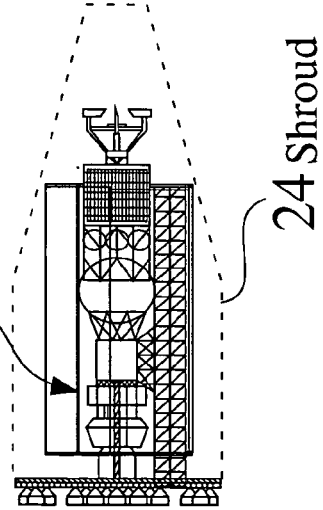
Figure 6:
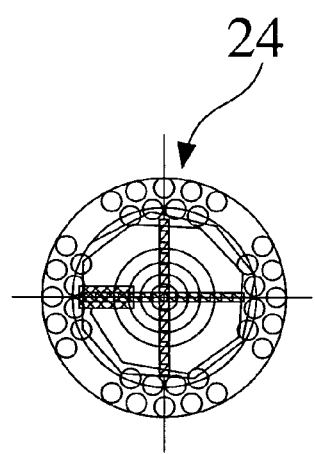
Figure 5:
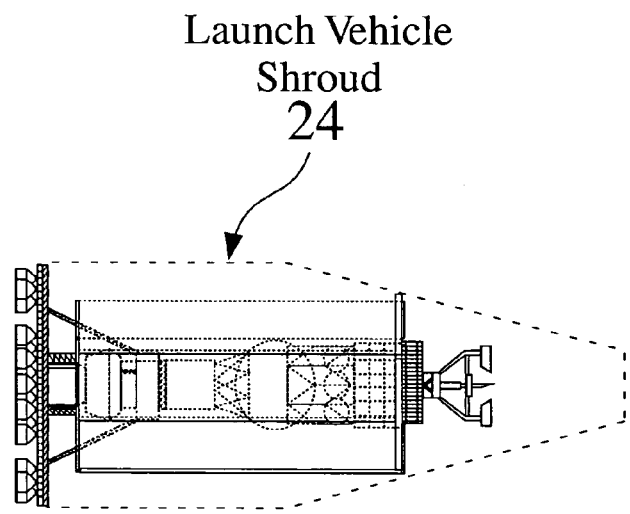
Figure 8:
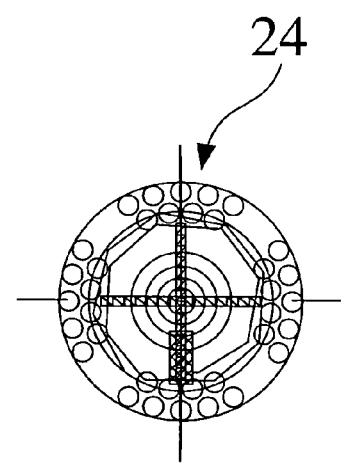
Figure 7:
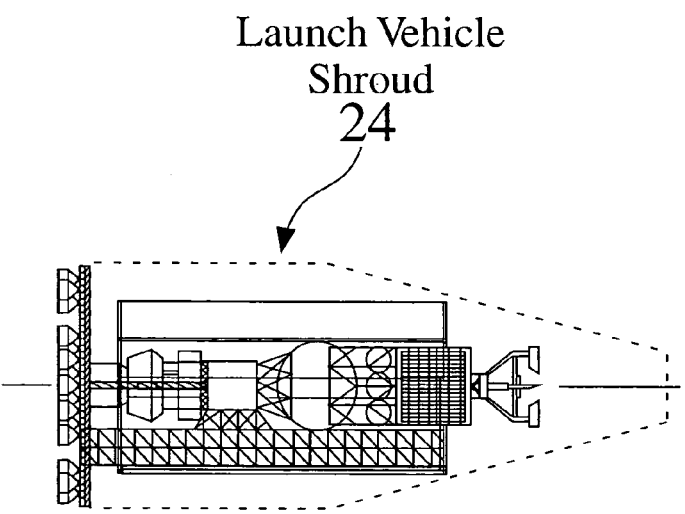

FIG. 4 reveals the present invention in a folded and collapsed configuration that may be loaded aboard a launch vehicle.

FIGS. 5, 6, 7 and 8 present side and end views of preferred embodiments of the present invention stowed aboard a launch vehicle.

Figure 9:
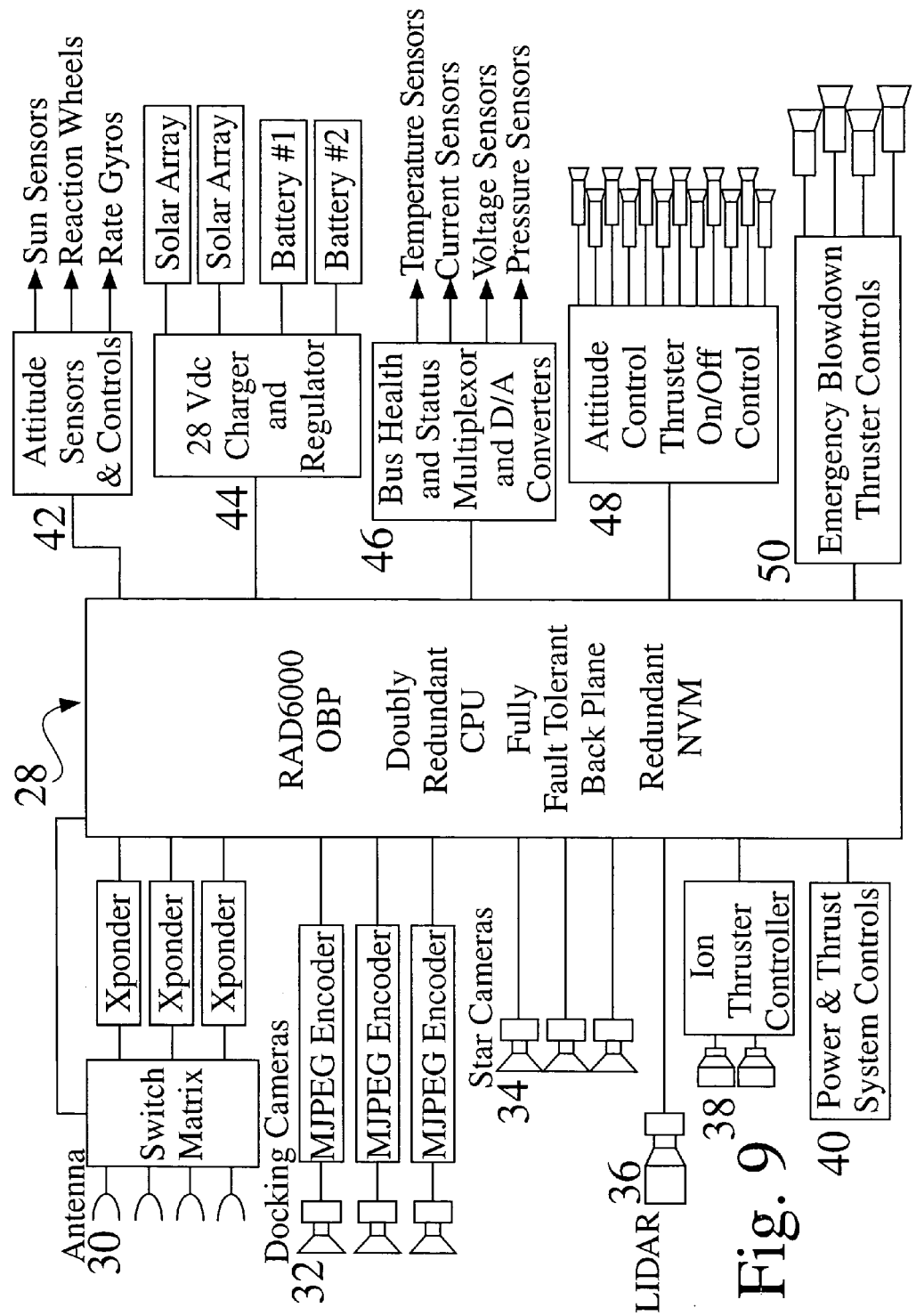

FIG. 9 is a block diagram of control systems installed in the IOSTAR™ spacecraft.

Figure 10:
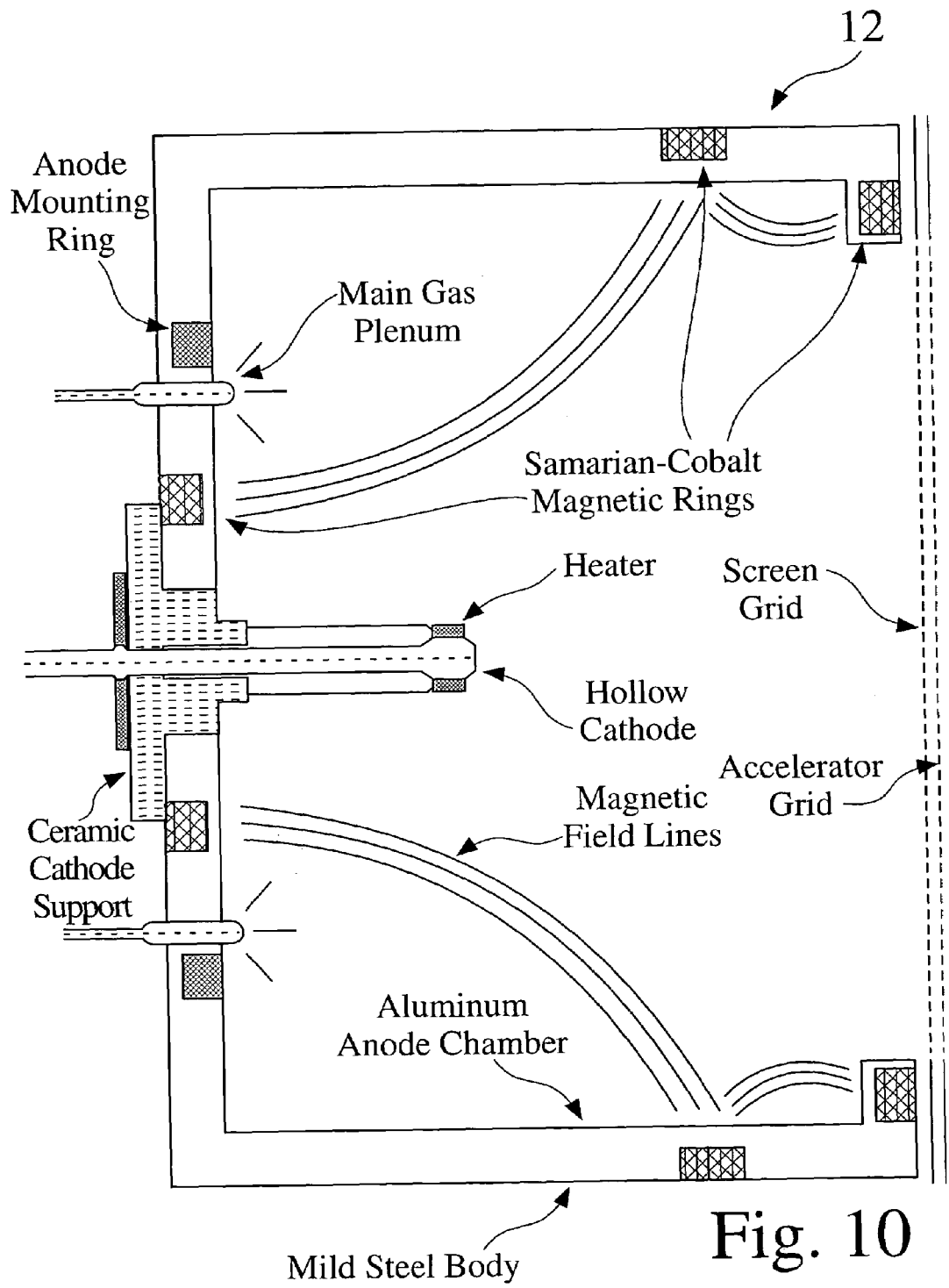

FIG. 10 is a cross-sectional view of an ion propulsion engine utilized by one embodiment of the IOSTAR™ spacecraft.

Figure 11:
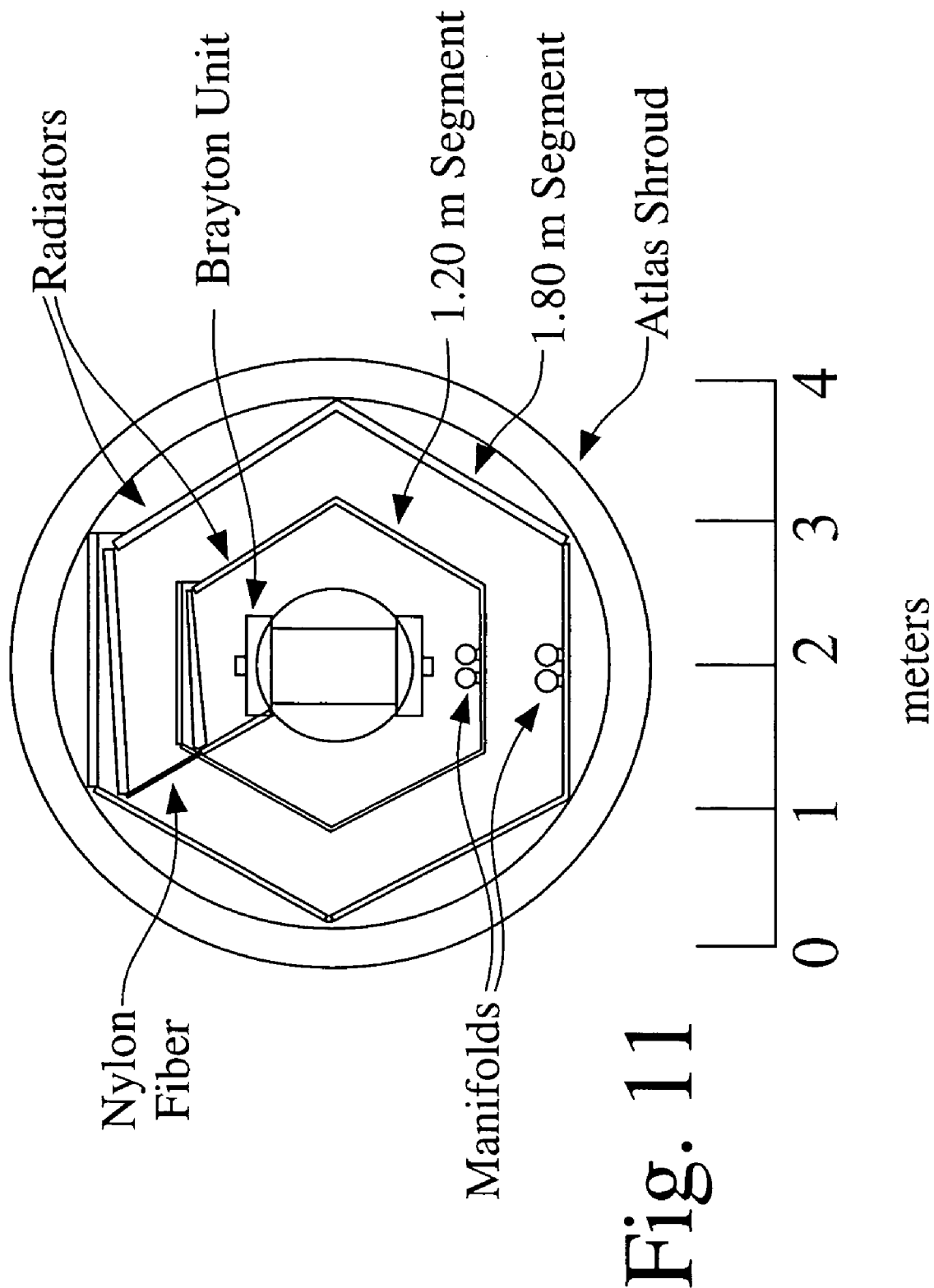

FIG. 11 is a cross-sectional view of a portion of one embodiment of the invention inside a launch vehicle shroud.

Figure 12:
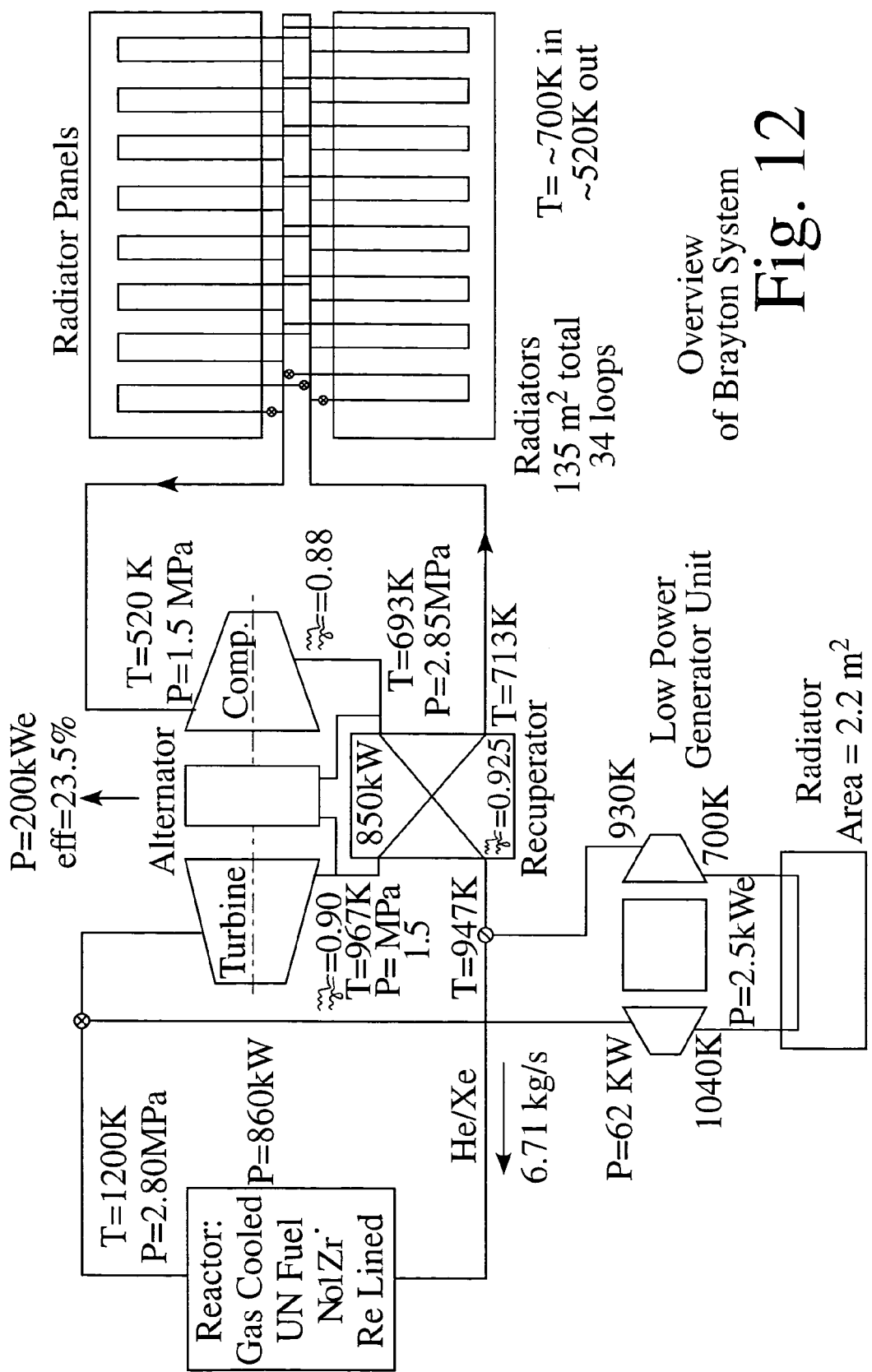

FIG. 12 presents a diagram which provides an overview of the Brayton System, which is used as the energy converter in one embodiment of the invention.

Figure 13:
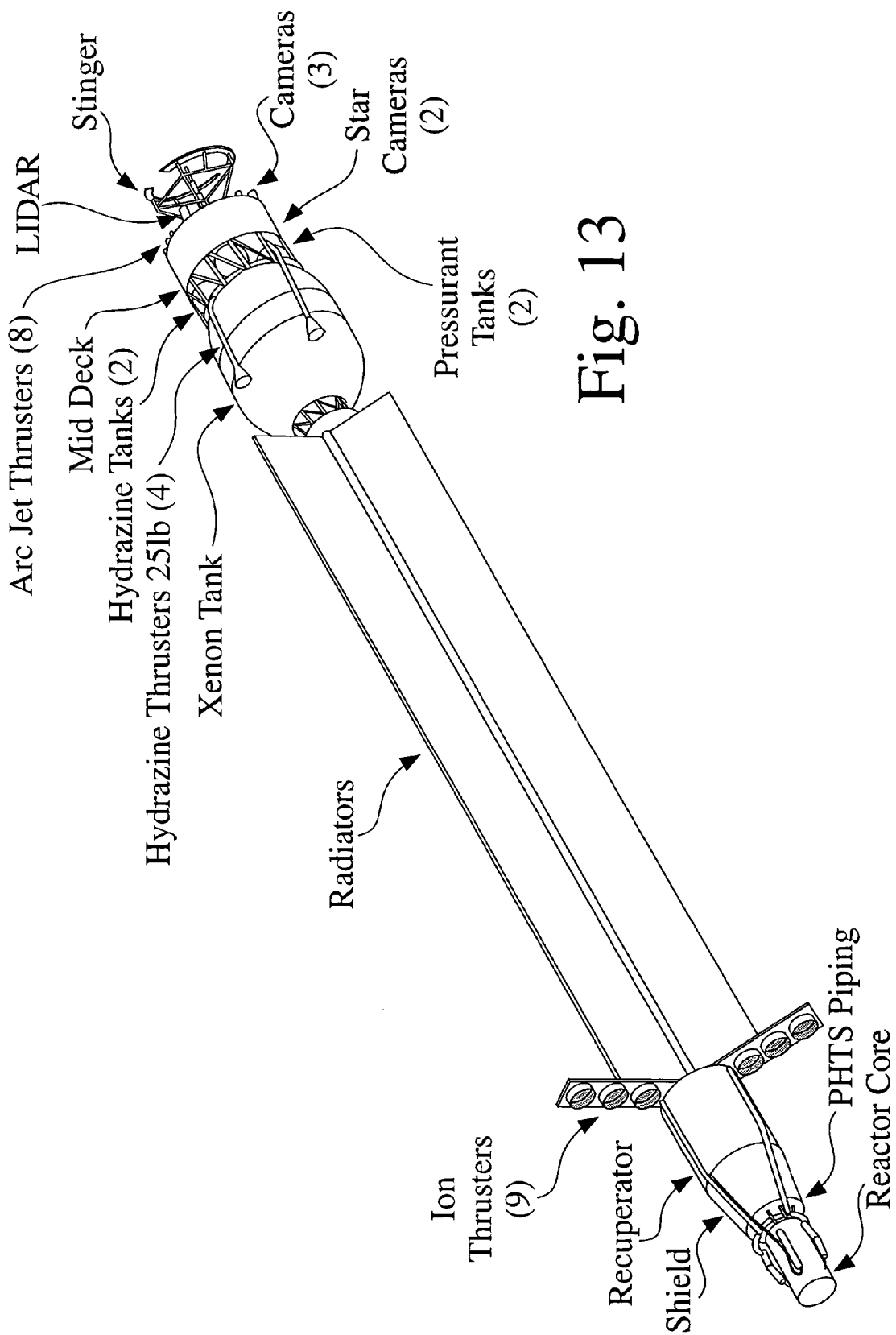

FIG. 13 supplies a perspective view of an alternative embodiment of the IOSTAR™.

Figure 14:
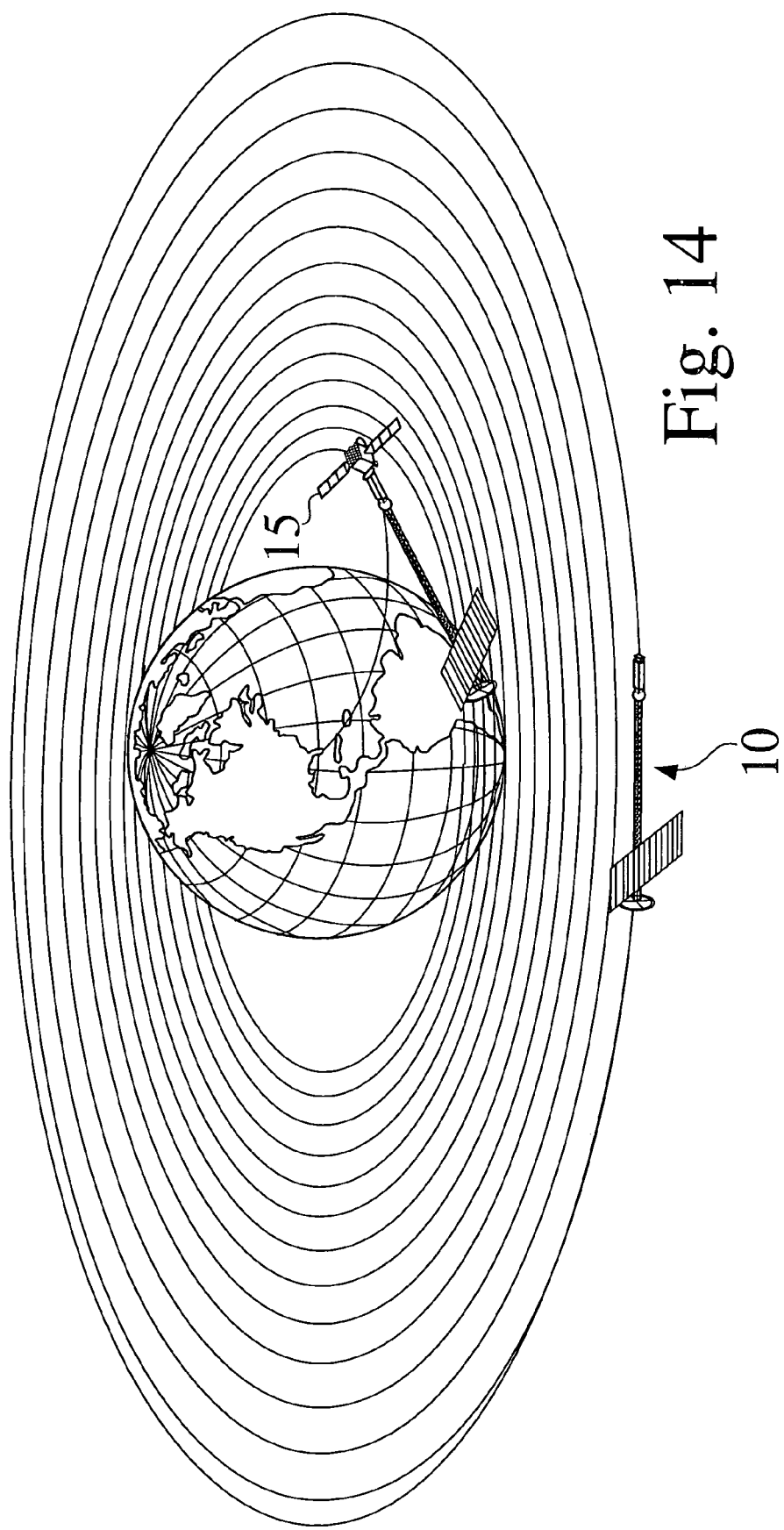

FIG. 14 is a schematic depiction of the process of conveying a satellite from a low Earth orbit to a higher orbit using the present invention.

Figure 15:
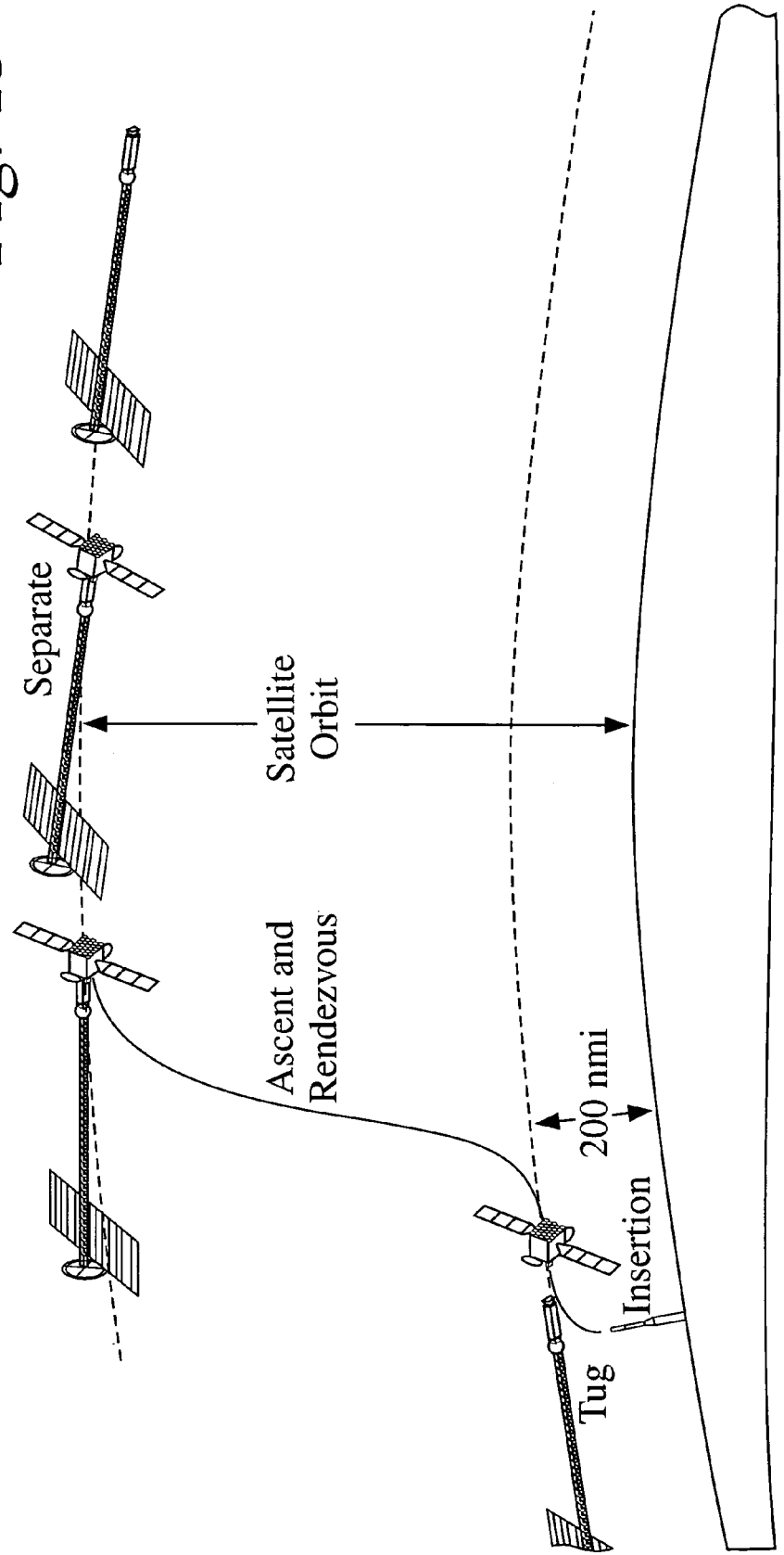

FIG. 15 illustrates a method for repositioning a satellite.

Figure 16:
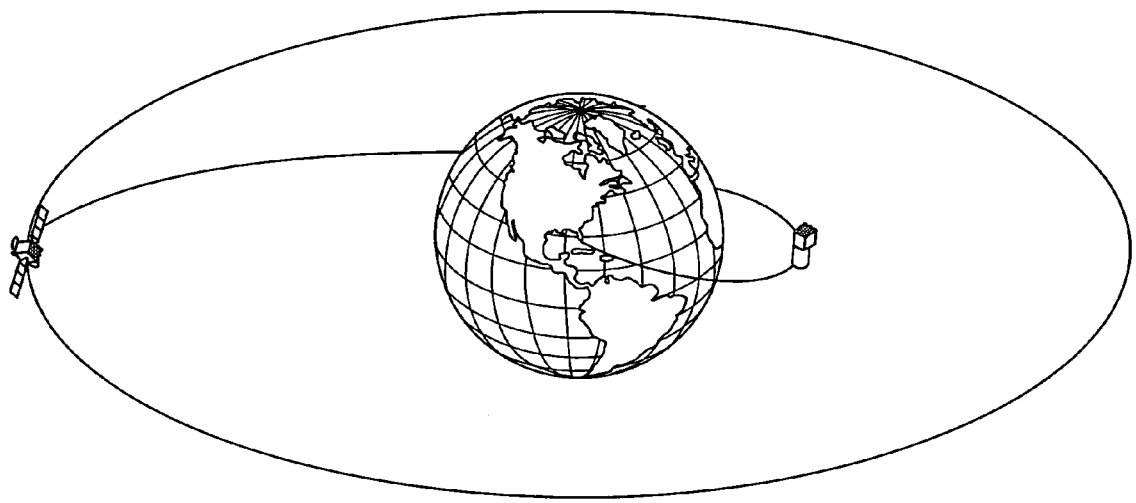
Figure 17:
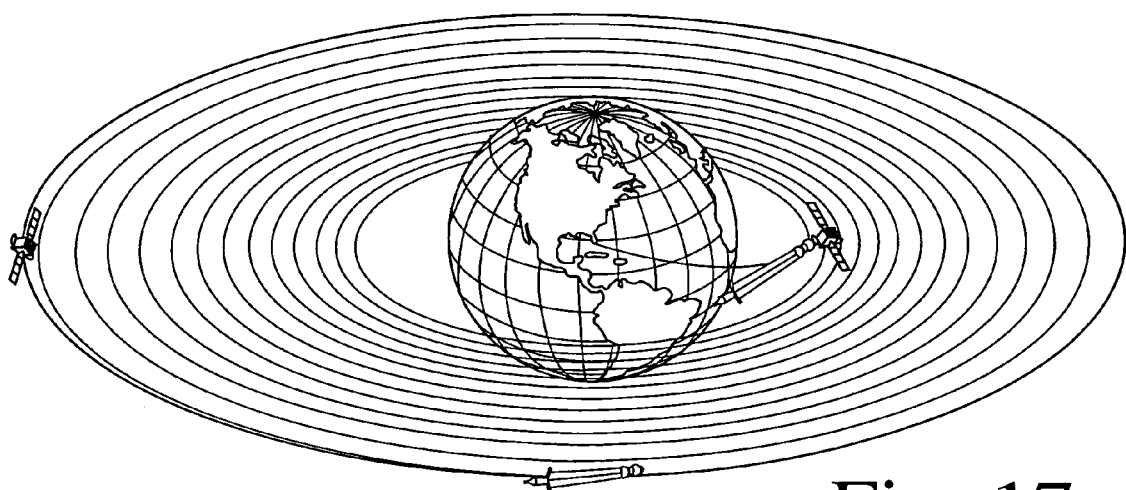

FIGS. 16 and 17 are comparisons of high orbit architectures for conventional and IOSTAR™ missions.

FIGS. 18, 19, 20 and 21 exhibit four IOSTAR™ missions.

Figure 22:
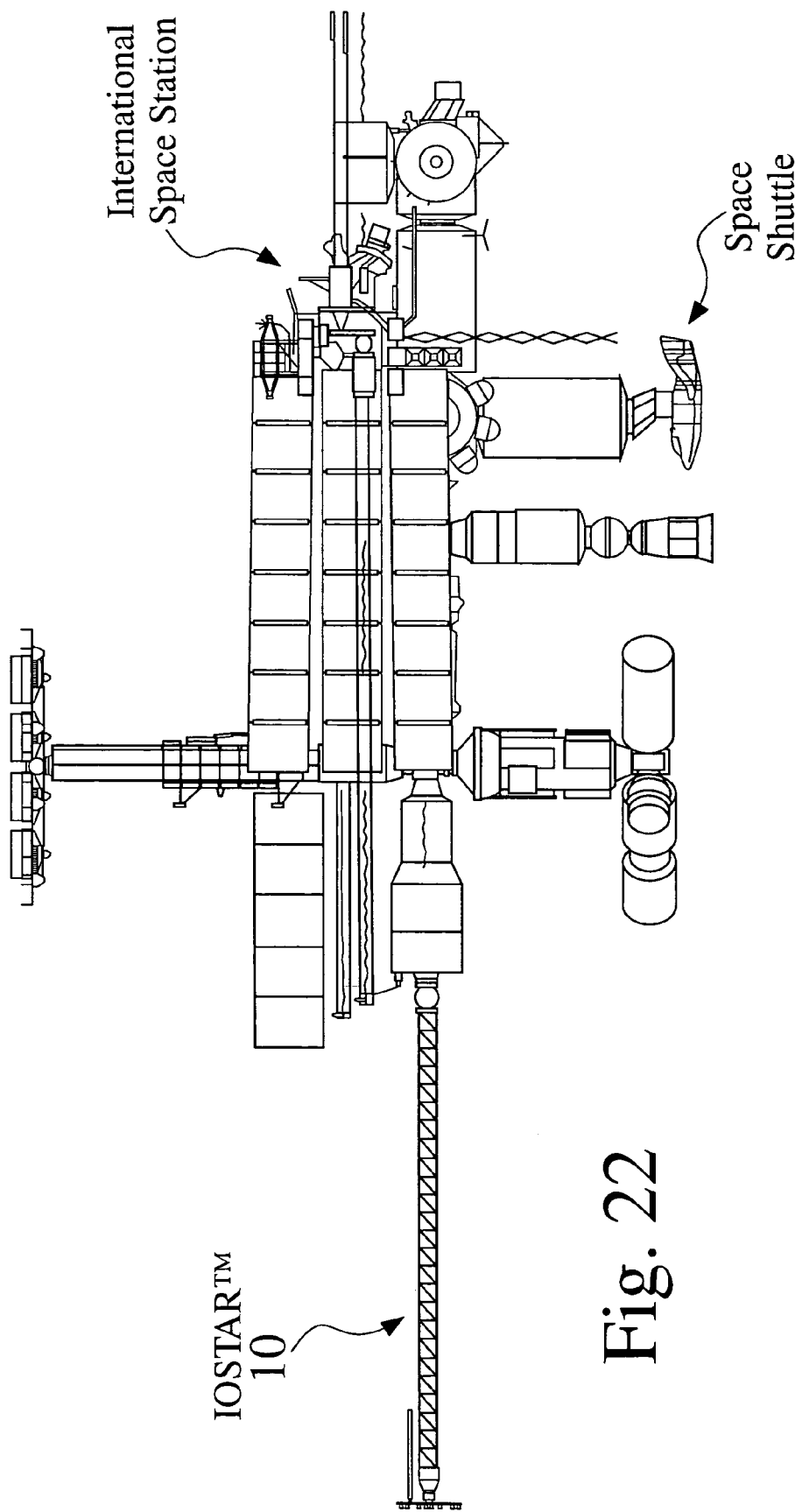
Figure 23:
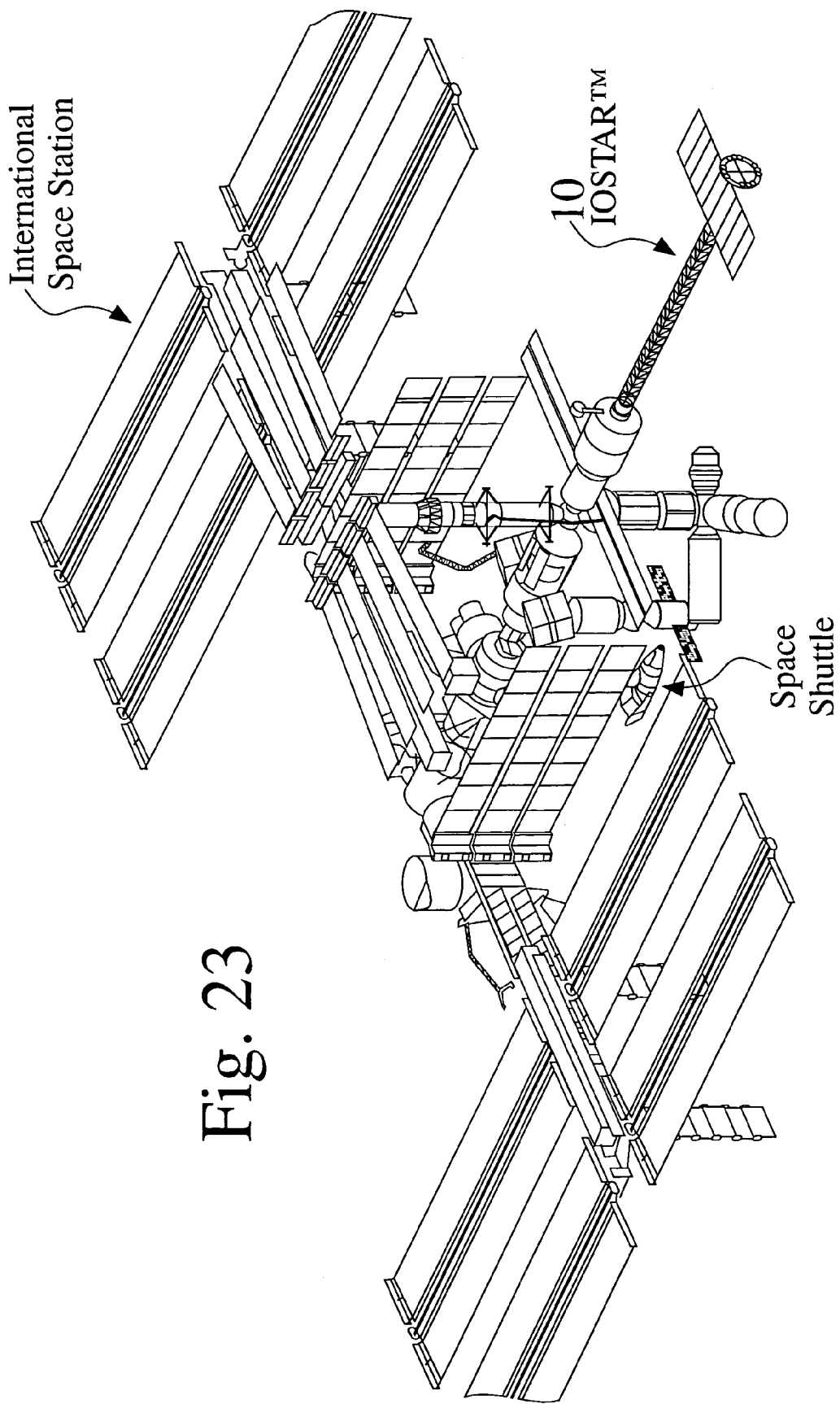

FIGS. 22 and 23 show the IOSTAR™ and the International Space Station.

Figure 24:
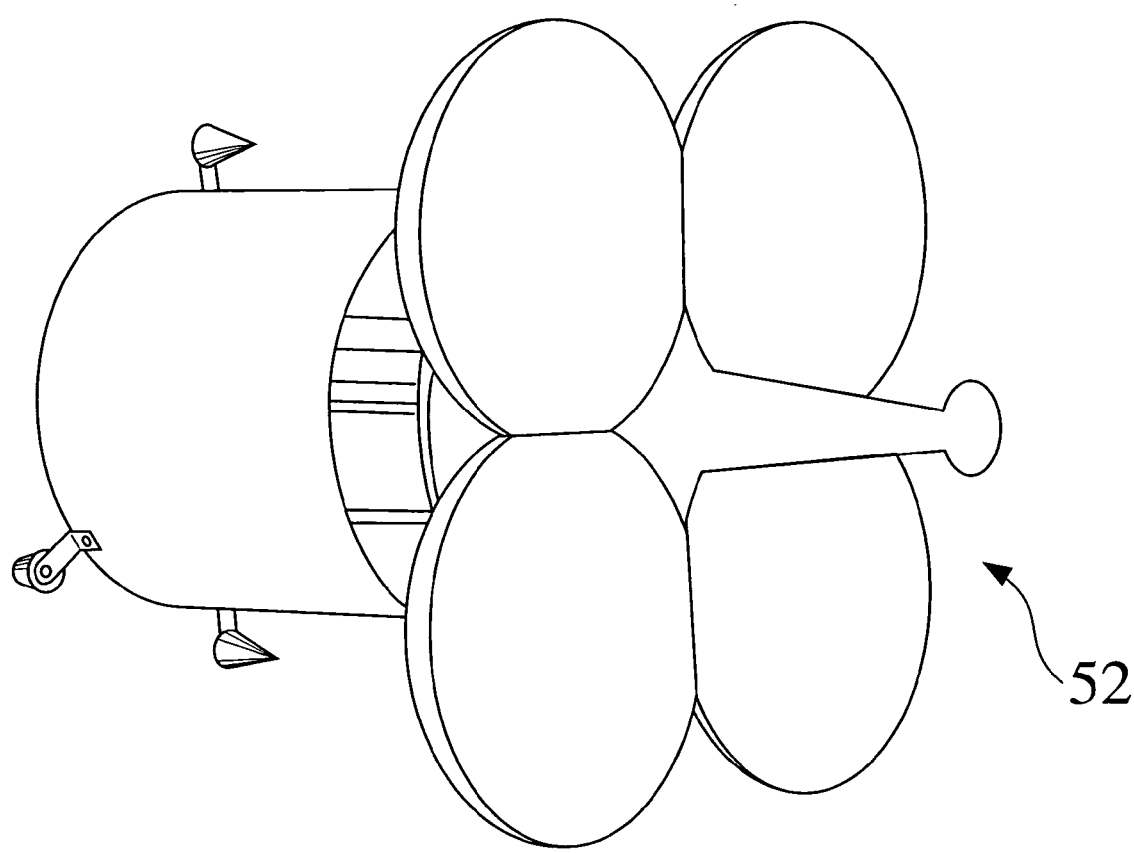

FIG. 24 depicts a satellite having an array of antennas that could be combined with the IOSTAR to provide direct broadcast services.

Figure 25:
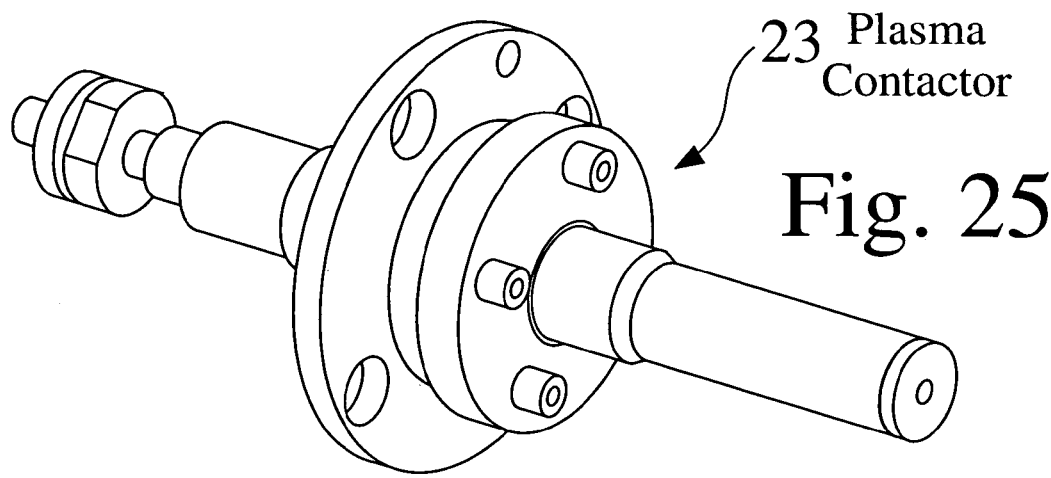
Figure 26:
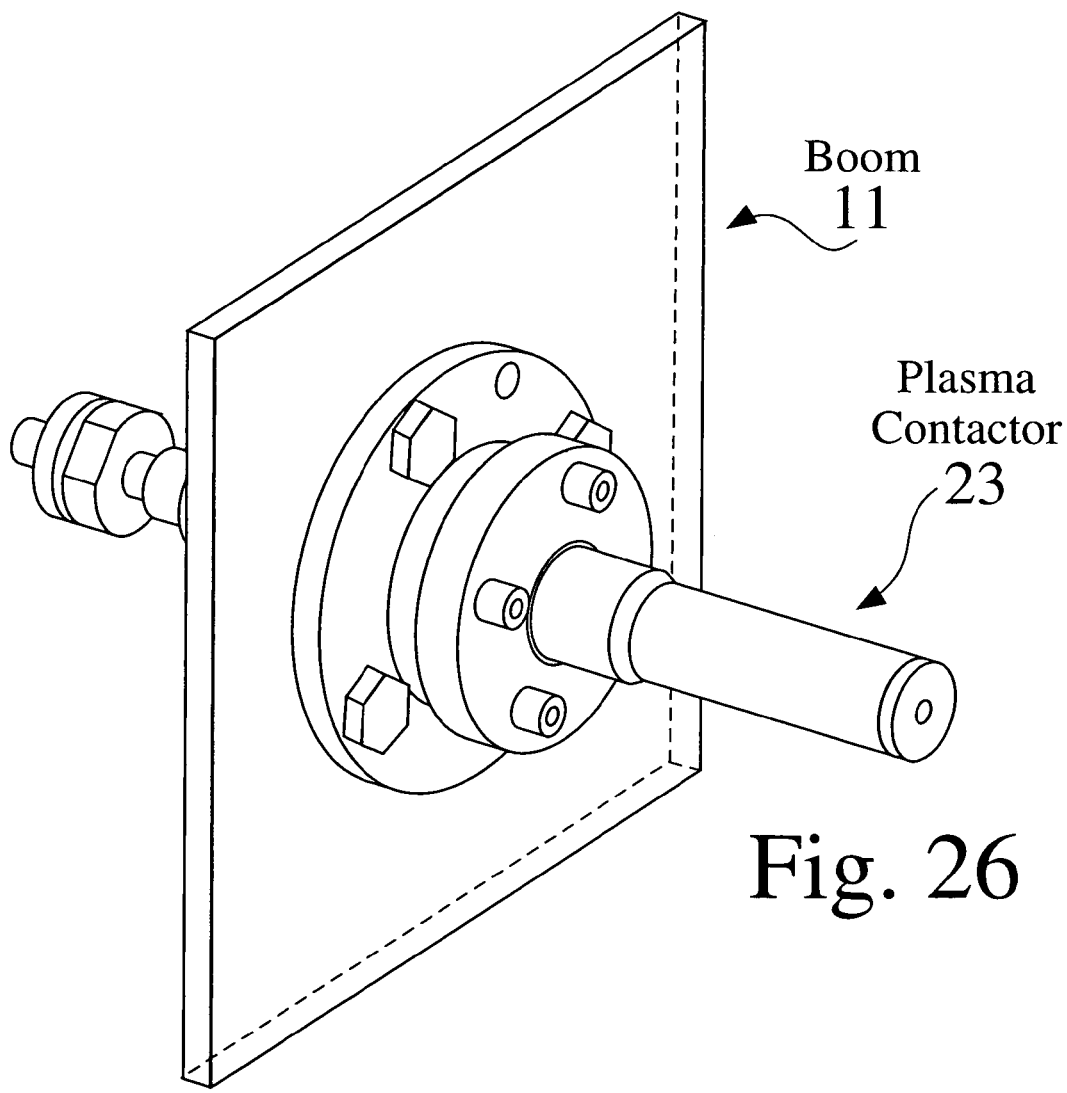

FIGS. 25 and 26 each reveal a plasma contactor.

A DETAILED DESCRIPTION OF PREFERRED & ALTERNATIVE EMBODIMENTS

I. Overview of Embodiments of IOSTAR™

FIGS. 1A and 1B reveal side and end views of one of the preferred embodiments of the In Orbit Transportation & Recovery System, or IOSTAR™ 10. IOSTAR™ is a Trade and Service Mark owned by the Assignee. IOSTAR™ is a reusable spacecraft 10 which is designed primarily for orbital transportation and rescue services.

In this Specification and in the claims that follow, the term "satellite" refers to any object in any orbit around any body, whether natural or man-made. A "celestial body" is any planet, moon, asteroid, comet, star or any other aggregation of matter. The term "spacecraft" concerns any man-made device or means used at high altitude, below orbital altitude, in orbit, or beyond the Earth's atmosphere, or for travel in space; including a ship, structure, machine or manufacture that may travel beyond Earth's orbit. The term "orbit" generally means a pathway or line of movement of an object that includes any position at any point or altitude above the surface of the Earth or other celestial body which allows an object, satellite or spacecraft to move above the Earth's surface with or without aerodynamic lift, up to a distance which is still within the Earth's gravitational field. Orbits may include pathways around the Earth, the Moon, the Sun or any other celestial body.

In general, the term "low Earth orbit" encompasses any orbital altitude below geosynchronous or geostationary orbit. In general, the term "high Earth orbit" encompasses any orbital altitude from geosynchronous or geostationary orbit to any position above geosynchronous or geostationary orbit within the Earth's gravitational field. In general, the term "space" refers to any position generally outside the Earth's atmosphere. The term "object" pertains to any configuration, embodiment or manifestation physical mass or matter, including natural objects such as asteroids or MMOD's (micro-meteoroids and orbital debris), man-made devices, or other things or items. The term "payload" encompasses any item or cargo that is carried or transported. A typical payload is a satellite, but a payload could be a load of material, supplies, equipment, or some other object.

In one embodiment of the invention, the backbone or central skeleton of the IOSTAR™ 10 comprises a lightweight but strong, generally metallic or composite, collapsible, compressible or at least partially foldable boom 11. The boom 11 provides structural support, but is also capable of fitting inside a launch vehicle when collapsed, and then extending to its fully deployed length after launch. The launch vehicle may be a single use vehicle, or may be reusable or expendable. In a preferred embodiment of the invention, the IOSTAR™ will be lifted into orbit by the United States Space Shuttle.

In one embodiment, one end of the boom 11 is connected to an electric propulsion system 12. In general, an electric propulsion system is any means which employs electromagnetic forces to generate thrust. In one embodiment, a tank 13 which stores propellant for the electric propulsion system 12 is connected to the boom 11 at the end opposite from the ion engines 12. In a preferred embodiment of the invention, the electric propulsion system is an ion propulsion system 12 which expels ions to produce thrust. Table One contains a list of some of the various types of electric propulsion systems that may be utilized to implement the present invention.

TABLE ONE

Electric Propulsion Alternatives.

Electrothermal
    Arcjets
    Resistojets
    Electrothermal thruster
    Continuous wave
    Laser & Laser Ablative
    Microwave heated thruster
Electromagnetic
    Magnetoplasmadynamic thruster
        Self-Field
        Applied Field
    Hall effect thruster
    Stationary plasma thruster
    θ-pinch thruster
    Compact toroid thruster
    Pulsed-inductive thruster
    Coil-gun
    Z-pinch discharge thruster
    Coax gun
    Pulsed-plasma thruster
    Rail-gun
    Mass-driverElectrostatic
    Ion engine
    Field emission
Other
    Magnetic loop sail
    Electrodynamic Tether The recitation of electric propulsion alternatives in Table One is not intended to exclude any unlisted or equivalent alternatives.

In a preferred embodiment of the invention, the ion engines 12 employ xenon ions, so the tank is filled with xenon. In an alternative embodiment, the ion propulsion system 12 includes a Hall thruster. Other embodiments of the invention may employ different fuels, and may utilize multiple fuels. The invention may utilize any tank means which holds, envelopes or stores suitable propellants.

Figure 2:
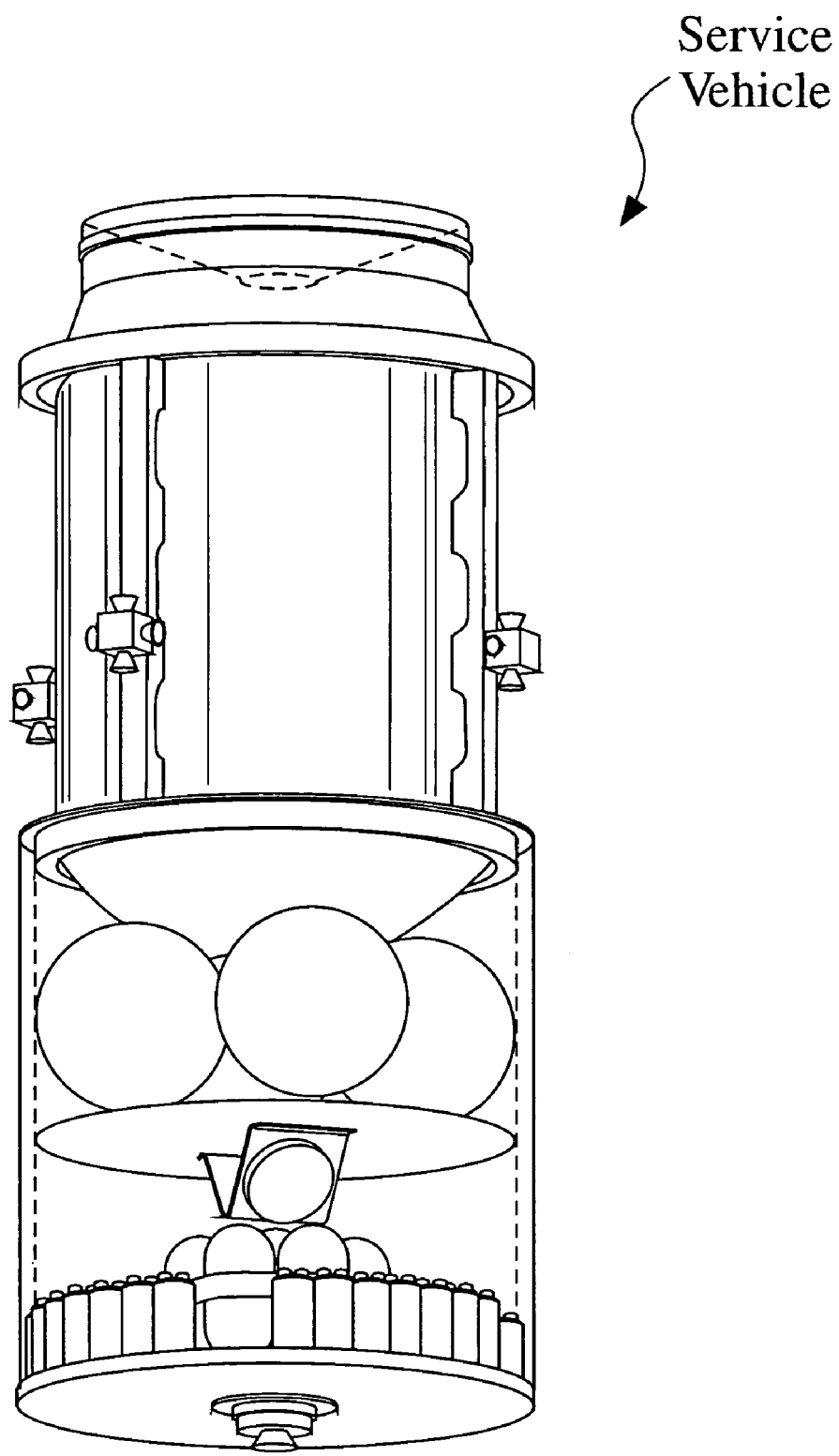
FIG. 2 depicts a separate service and refueling vehicle.

In a preferred embodiment of the invention, the tank 13 is refillable, and may be refilled in a relatively low or zero gravity environment. One embodiment of the invention includes one or more tanks that provides the propulsion system with propellant. In one embodiment of the invention, the tank may be refilled by a separate, automatic, unmanned spacecraft as shown in FIG. 2. When the IOSTAR™ vehicle runs low on propellant, it will be replenished by a servicing vehicle that either transfers all its propellant and is then released; or transfers its propellant gradually and is released when empty. In one embodiment, the IOSTAR™ will have a lower pressure tank so that pumping is kept to a minimum or eliminated. In another alternative, the size of the lower pressure tank is smaller, and includes limited life thrusters attached to the servicing vehicle. The electric thrusters on the service vehicle can be operated at higher power than the rest of the thrusters on the IOSTAR™ to enhance performance since the high power reduces lifetime, the thrusters are replaced with the next service vehicle. The thrusters may have a limited lifetime, and be used for a relatively small number of missions, or, may last for the entire lifetime of the IOSTAR™. The service vehicle may be equipped with application specific thrusters that are replaced with the next service vehicle.

Table Two contains a list of some of the propellants that may be employed to practice the present invention.

TABLE TWO

Propellants

Xenon
Mercury
Aluminum
Bismuth
Krypton
Helium
Argon
Production Kr-Xe mix
Hydrogen
Nitrogen
N2 + 2H2
NH3
H2O
NH3
CO2
N2H4
CH4
Air
Lithium
Cesium
Indium
Teflon The recitation of propellant alternatives in Table Two is not intended to exclude any unlisted or equivalent alternatives.

The end of the boom 11 which holds the propellant tank 13 is equipped with reusable docking hardware 14 that is able to contact or grasp a satellite 15 or some other object in space. In one embodiment of the invention, the tank is replenishable. This docking hardware 14 may be referred to as a grasping device, and may comprise any multiple-use means for engaging an object above the Earth. Many different embodiments of the docking hardware 14 may be incorporated in the present invention. In general, the preferred embodiment of the invention is reusable, utilizes a multiple-use docking device 14, which, unlike some of the prior art, is designed for many missions over a relatively long life-time.

The docking hardware 14 may be configured to interact with a wide variety of satellites 15 or other objects above the surface of the Earth. In general, the docking hardware 14 comprises any reusable or multiple-use means which is adapted to engage a payload launch vehicle interface, or to otherwise engage an object in space. Unlike some previous equipment designed for launch into orbit, the present invention includes a grasping means 14 which is not permanently affixed or connected to a payload.

A radiator 16 is disposed generally perpendicular to the boom 11 near the ion thrusters 12. The radiator 16, which conveys a coolant through manifold 17 and fluid flow tubes 18, dissipates heat from an energy converter out to space. The energy converter is powered by a nuclear reactor 19. The radiator 16 is generally situated between the grasping device 14 and the reactor 19. In general, the radiator 16 is a pumped fluid loop. An alternative embodiment comprises a capillary pump loop and/or heat pipes. In another alternative embodiment of the invention, the radiator 16 may be disposed along the boom 11, or a single combined radiator/boom means may be employed.

The reactor 19 generates heat through the controlled fission of nuclear fuel. This heat is then converted to electrical power. In a preferred embodiment, the reactor 19 is gas-cooled. In alternative embodiments, the reactor 19 employs a liquid-metal coolant, or some other working fluid or heat pipes. The reactor 19 is coupled to a radiation shield 20, which protects the object, payload or satellite 15 from radiation generated by the reactor 19. In one embodiment of the invention, the radiator 16 is configured to remain entirely within the protective zone of the radiation shield 20. In one embodiment, the radiation shield 20 incorporates multiple zone shielding to minimize mass. In another embodiment, the radiation shield includes a recuperator that is also employed as a gamma shield.

In a preferred embodiment of the invention, from 250 kW to 500 kW of sustained electrical power may be generated aboard an IOSTAR™, which vastly exceeds the sustained power generating capabilities of any prior man-made satellite or spacecraft. This power generation capacity is huge when compared to the power levels of conventional satellites and spacecraft, which typically operate with less than 20 kW of power. This immense on-orbit power generating capacity enables the IOSTAR™ to conduct missions which are not feasible using conventional satellites. These missions include, but are not limited to, satellite inspection, monitoring, rescue, retrieval, repair, servicing, refueling and repositioning; direct communication services; in-orbit power generation for other spacecraft like the International Space Station; and interplanetary tasks, operations or transfers that may occur well beyond Earth orbit, such as trips to the Moon, the Asteroids, or the Planets.

The reactor 19 is also coupled to an energy converter 22 which converts heat to electrical energy. In one embodiment, the energy converter 22 includes a turbine driven by fluid that is heated by the reactor 19 to produce a large amount of electrical power. The converter 22 is coupled to the boom 11, next to the radiation shield 20. An energy converter may be an direct converter, which converts heat directly to electricity. As an alternative, an energy converter may be an indirect converter, which converts thermal energy to mechanical energy, and then to electrical energy. In a preferred embodiment of the invention, the converter employs the Brayton Cycle. In alternative embodiments, the converter may be a Rankine or Stirling Cycle converter. A thermoelectric or thermionic converter may also be employed. In a preferred embodiment of the invention, a recuperator may be connected to the energy converter.

II. Details of IOSTAR™ Embodiments

Figure 3:
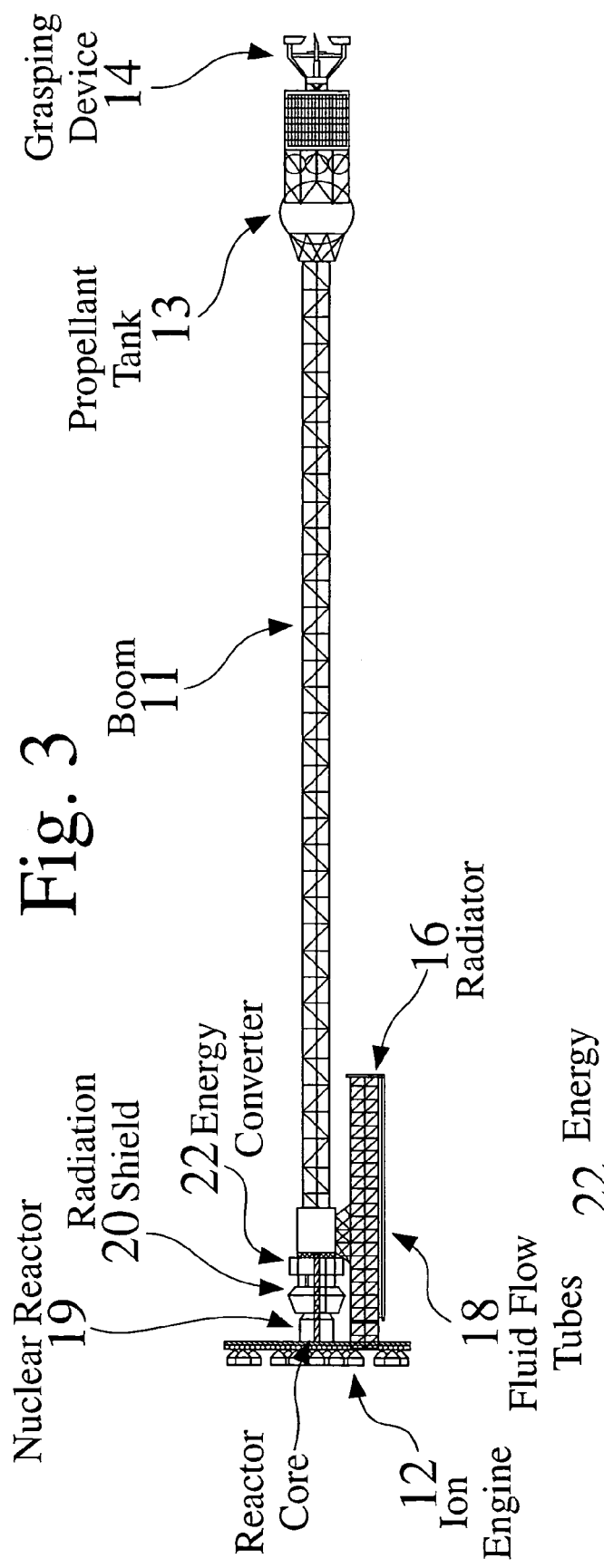
FIG. 3 is a side view of the present invention in its fully deployed configuration.

FIG. 3 provides a side view, where the IOSTAR™ is viewed along its side in the plane of the radiator panels 16. FIG. 4 offers a view of the invention in its fully collapsed configuration, capable of being stowed in a launch vehicle shroud 24.

FIGS. 5, 6, 7 and 8 present more detailed end and cross-sectional views of the IOSTAR™ stowed in the launch vehicle shroud 24. In one preferred embodiment of the invention, the IOSTAR™ is placed in orbit using the United States Space Shuttle.

FIG. 9 supplies a schematic block diagram of control systems 28 designed for a preferred embodiment of the invention. A doubly redundant set of CPUs manage the many subsystems aboard the IOSTAR™, including antennas 30, docking and star cameras 32, 34, RADAR and LIDAR systems 36 for tracking objects or satellites 15, an ion thruster controller 38, and power and thrust system controls 40. These systems enable the present invention to rendezvous and dock with a satellite or object in orbit. In an alternative embodiment, the various sensors and cameras aboard the IOSTAR™ may be used to conduct remote sensing missions. The block diagram also relates the CPUs to attitude sensors and controls 42, the 28VDC power system 44, the bus health and attitude control subsystems 46, 48 and an emergency blowdown thruster control 50.

FIG. 10 offers a detailed schematic view of the ion propulsion system 12. A mixture of helium and xenon flows from tank 13 to the ion engine 12, where ions are created by a hollow cathode and accelerated through a series of grids to provide thrust for the IOSTAR™ spacecraft.

FIG. 11 reveals a cross-sectional view of one embodiment of the invention, depicting the launch vehicle shroud 24, radiators 16, manifolds 17 and energy converter 22.

FIG. 12 supplies a schematic diagram which offers an overview of the Brayton System, the energy converter 22 that is utilized in a preferred embodiment of the invention. Heat from the reactor 19 drives a turbine, which, in turn, drives an alternator and a compressor. A recuperator increases the efficiency of the system by recovering a portion of the heat from the turbine exhaust to pre-heat the working fluid. Radiators 16 expel waste heat to outer space.

FIG. 13 provides a view of an alternative embodiment of the IOSTAR™ which includes radiators disposed along the boom.

III. IOSTAR™ Missions & Operations.

The present invention is different from conventional orbital systems, in that it will be capable of accomplishing many missions over a long life. Although the IOSTAR™ will be reusable, in one embodiment the entire system will be capable of being launched using a single launch vehicle, preferably the United States Space Shuttle. Other launch vehicles that are reusable or expendable may also be employed. The first implementation of the IOSTAR™ will be constructed primarily or entirely on the Earth's surface, and then will be launched into orbit. Later implementations may be partially or completely constructed in orbit. In general, the IOSTAR™ may be controlled from a terrestrial operations center, or may operated by an on-orbit controller.

In general, the invention is fully extended after launch, and is then ready for operations. A first, general mission will comprise locating a satellite already in orbit, and then grasping, moving and releasing that satellite. IOSTAR™ will be able to move spacecraft between low Earth orbits and positions in higher orbits or to other locations in our Solar System. This primary mission of moving an object in space includes transporting satellites from one position in an orbit to another, from one orbit to another, to distant locations beyond Earth orbit or from distant locations beyond Earth orbit back to Earth orbit. The IOSTAR™ may be used for missions to the Moon, to the Planets or to the asteroids. Another mission may include changing the position of a satellite so that it is purposefully de-orbited.

In general, the term "rendezvous" pertains to the approach of an IOSTAR™ to another object or objects in space. Rendezvous may or may include station-keeping, or any contact, probing, interaction, coupling, observing or docking between an IOSTAR™ and another object.

Once the IOSTAR™ completes its rendezvous and docking with a satellite, the satellite may be transported for retrieval and/or repair. In general, the repositioning of a satellite from one location to another will involve moving the satellite along an incremental, expanding, generally spiral pathway. FIG. 14 illustrates one of the basic methods of the invention. A satellite 15 is first launched using a conventional booster to a low Earth orbit of roughly 150 nautical miles. The IOSTAR™ 10 then completes a rendezvous with the satellite 15, and engages the satellite 15 with its docking hardware 14. The IOSTAR™ then gradually raises the altitude of the satellite 15 to an operational orbit by moving the payload along an incremental, expanding spiral pathway. This procedure provides substantial cost savings for delivering a spacecraft to an operational orbit compared to the conventional technique of launching spacecraft with a multi-stage rocket. In an alternative embodiment of the invention, the IOSTAR™ will be able to rendezvous with an object beyond Earth orbit. In this embodiment, the IOSTAR™ will be capable of retrieving an object or spacecraft from a remote location beyond Earth orbit.

FIG. 15 depicts an orbital repositioning mission. The invention may not only be used to transport a new satellite to its destination orbit, but may also be employed to capture a satellite which has reached the end of its useful life and needs to be safely de-orbited or placed in a disposal orbit.

In general, the primary IOSTAR™ mission will involve rendezvousing and docking with a spacecraft which is already in a low Earth orbit. After docking, the IOSTAR™ will then move from a low Earth orbit to a high Earth orbit or to a position beyond Earth orbit. As an alternative, the IOSTAR™ will first travel to a high orbit or to a position beyond Earth orbit, locate and grasp an object, and then relocate it to Earth orbit or to a different position beyond Earth orbit.

FIGS. 16 & 17 compare a conventional geosynchronous mission to an IOSTAR™ mission. In a conventional launch, a satellite reaches high orbit in seven to ten hours, but at great expense. Using IOSTAR™, the satellite takes a gradual spiral path over a 45 to 65 day period to reach high orbit, but at a much lower cost.

FIGS. 18, 19, 20 and 21 furnish generalized views of four representative IOSTAR™ missions, including in-orbit placement, in-orbit repair, recovery and retrieval and Space Station Servicing. While all the IOSTAR™ objectives and missions are too numerous to delineate in this Specification, Table Three provides a representative and illustrative list of uses for the present invention in outline form.

TABLE THREE

Objectives & Missions

Correct an anomalous satellite Earth orbit
Provide mobility for a satellite in orbit
Move a satellite in space from one geostationary orbital position to another
Move a satellite in space from one geosynchronous orbital position to another
Inspect a satellite in orbit
Repair a satellite in orbit
Extend useful life of a satellite
   By replenishing a consumable
   By replenishing power
   By replenishing fuel
   By replacing a battery
   By replacing a satellite component
Reposition a satellite to a lower orbit
Reposition a satellite to a higher orbit
Service a spacecraft in combination with the U.S. Space Shuttle
Service a spacecraft in combination with the International Space Station
Reposition a spacecraft from a low to a high orbit to realize cost savings compared to the costs of a
   conventional launch
Move a satellite into a disposal orbit
Provide services to an insurer TABLE THREE-continued Objectives & Missions Salvage a spacecraft in accordance with an insurance contract
Enable an insurer to lower launch premiums
Obtain information about a failure of an orbiting asset or spacecraft
Enable an insurer to lower the financial risks of a spacecraft launch
Maintain a fleet of operating spacecraft, including United States Global Positioning Satellites
Supply on-orbit power to another spacecraft
Move spare spacecraft from one orbital altitude or plane to another
Provide services to a spacecraft manufacturer
Provide services to a spacecraft user
Provide services to a government agency
Use IOSTAR ™ as a reusable upper stage of a conventional launch vehicle to reduce launch costs
Use IOSTAR ™ and a laser used for orbital debris removal
Use laser to divert an asteroid
Produce propellant from an asteroid
Produce propellant from water launched into orbit from Earth
Produce propellant from a stable, storable material launched into orbit from Earth
Process ice present on an asteroid by electrolysis to form hydrogen and oxygen
Process carbonaceous material present on an asteroid to form a storable propellant
Recycle satellites in space FIGS. 22 and 23 portray the IOSTAR™ in combination with the International Space Station. One embodiment of the invention will be configured to provide direct communication services that include any one or two-way transmissions or emanations between or among the IOSTAR™ and terminals on or near the Earth's surface, or with other satellites or spacecraft. One example of a conventional direct communication service is a high-bandwidth transmission to consumers like DirecTV™. In general, these direct communication services will be conducted using electromagnetic, optical or any other suitable frequencies or modes of communication over a distance. In one embodiment of the invention, IOSTAR's direct communication services will be conducted using frequency bands 11 and 12. Frequency band 11 extends from 30 to 300 GigaHertz, and is also referred to by the term "millimetric waves." Frequency band 12 extends from 300 to 3000 GigaHertz or 3 TeraHertz, and is also referred to by the term decimillimetric waves. This nomenclature of frequency bands was adopted in the Radio Regulations of the International Telecommunication Union, Article 2, Section 11, Geneva; 1959.

These direct communication services will generally be enabled by IOSTAR's enormous power generating capabilities. FIG. 24 is a perspective view of a satellite having an array of antennas which may be used in combination with an IOSTAR™ to provide a direct broadcast system 52. Since the IOSTAR™ can generate very high levels of electrical power compared to conventional satellites 15, it may be used to transmit direct broadcast signals at extremely high frequencies. The Ka-Band (20–30 GHz) is the highest range of radio frequencies that are currently used by commercial satellites to communicate with customers on the ground. By drawing on its massive power supply, the IOSTAR™ Direct Broadcast System will be capable of offering regulated direct broadcast signals at frequencies of 100 GHz and beyond using high power amplifiers, such as a traveling wave tube amplifiers or grid amplifiers. This direct broadcast system may also employ and a beam-forming array or a steerable antenna to penetrate layers of the atmosphere which absorb and scatter conventional, lower power signals. In general, the present invention is capable of generating a vast amount of electrical power to provide a wide variety of direct communication services that offer direct transmissions between the present invention and terrestrial terminals. In one embodiment of the invention, direct communication services are conducted using frequency bands 11 and 12. In general, these direct communication services may be provided by the present invention utilizing any means, mechanism or phenomenon that exploits particle or electromagnetic wave transmissions, forces, fields or action at a distance, including the radio-frequency and optical spectra.

IV. Power Generation Using a Conductor in Orbit

In one alternative embodiment of the invention, a conductor in orbit is used to generate electrical energy. When a conductor or tether is moved across the Earth's magnetic field in orbit, the conductor acts like a dynamo circuit or an electric motor. The return current flows in the Earth's ionosphere, which conducts electricity. The electrical current is generated at the expense of the kinetic energy of the conductor in orbit, since the magnetic force on the conductor opposes its orbital motion and slows it down. The process is also reversible—when an electric current is pumped into the conductor or tether, the magnetic force boosts the orbital motion and raises the orbit to a higher altitude.

See: http://www-istp.gsfc.nasa.gov/Education/wtether.html

Generating Power

Figure 1:
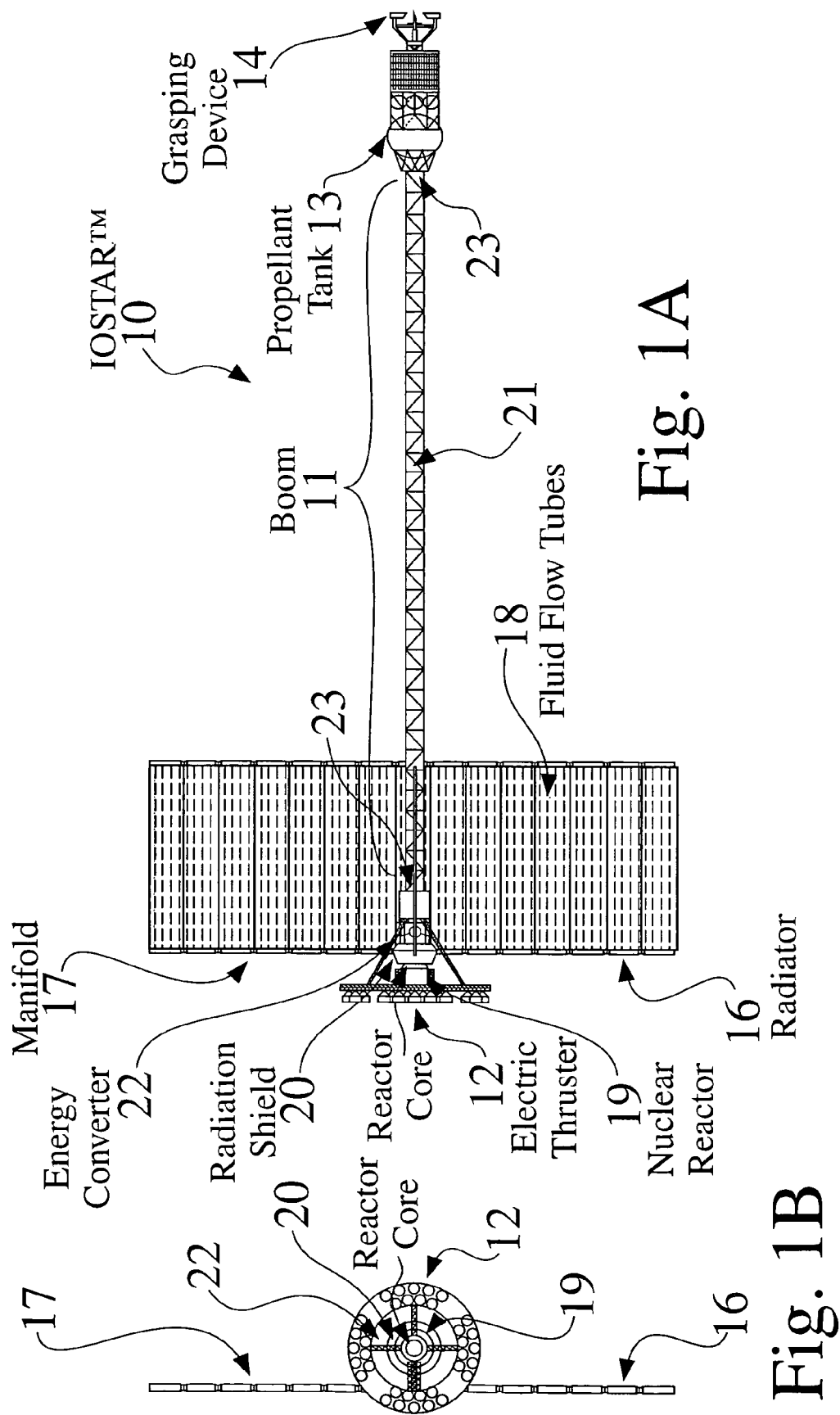

In an alternative preferred embodiment of the invention, portions of the boom 11 and radiator 16 contain a conductor 21 or conductive elements capable of carrying electric current. This conductor 21 may comprise a wire, cable, line, linkage, mesh, strut, support, structural member, tether, protuberance, applied conductive layer or film, or any other conductive feature or surface. A current may be passively generated by the orbital motion of the boom 11 and/or the radiator 16, which cut through the magnetic field lines of the celestial body being orbited. This motion induces a voltage along the length of the boom 11 and radiator 16. Current can be generated with a conductive element loop along the boom 11 and/or radiator 16. Current may also be generated using plasma contactors 23, which are field effect devices having many sharp points or hollow cathodes. The location of these contactors 23 are shown in FIG. 1, and are depicted on the ends of the boom 11 in FIG. 25. The contactors 23, which act as both electron emitters and collectors, provide a plasma electron emission current return path through the ambient plasma of the celestial body being orbited. The contactors 23 enable the spacecraft to "contact" or interact with the plasma of the orbited celestial body. In one embodiment, contactors are placed on each end of the boom 11.

Generating Force

The same conductor 21 in orbit may use electric power from the reactor 19 and energy converter 22 to drive current into the conductor. The current in the conductive elements 21 of the boom 11 and/or radiator 16 can "push" against the celestial body's magnetic field to increase the spacecraft's orbital energy and raise the spacecraft's orbit altitude. Conventional rockets push against their own exhaust, but this embodiment allows the IOSTAR™ spacecraft to push against the orbited celestial body's magnetic field. Rotational angular momentum of the celestial body is transferred to the orbital angular momentum of the spacecraft, providing an electromagnetic propellantless propulsion system.

Examples of Plasma Products

Electric Propulsion Laboratory, Inc. manufactures Space Flight Hollow Cathode (SFHC) Products. EPL also offers a Hollow Cathod Plasma Contactor (HCPC™), which supports space plasma contacting functions.

See: www.electricpropulsionlaboratory.com

The Rocketdyne Division of Boeing North American also produces a plasma contactor system, which they call a Hollow Cathode Assembly.

See: www.grc.nasa.gov/WWW/RT1998/5000/5430patterson.html

SCOPE OF THE CLAIMS

Although the present invention has been described in detail with reference to a particular, preferred embodiment and alternate embodiments, persons possessing ordinary skill in the art to which this invention pertains will appreciate that various modifications and enhancements may be made without departing from the spirit and scope of the claims that follow. The various embodiments, implementations and applications that have been disclosed above are intended to educate the reader about particular embodiments, and are not intended to constrain the limits of the invention or the scope of the claims. The List of Reference Characters which follows is intended to provide the reader with a convenient means of identifying elements of the invention in the Specification and Drawings. This list is not intended to delineate or narrow the scope of the claims.

LIST OF REFERENCE CHARACTERS

10 In-Orbit Space Transportation & Rescue System, or IOSTAR™
11 Collapsible spacecraft boom
12 Electric propulsion system
13 Propellant tank
14 Grasping/Docking mechanism
15 Satellite or other payload or cargo
16 Radiator
17 Manifold bellows
18 Gas flow tubes
19 Nuclear reactor
20 Radiation shield
21 Conductor
22 Energy converter
23 Plasma contactor
24 Launch vehicle
28 Block diagram of control systems
30 Antenna
32 Docking cameras
34 Star cameras
36 RADAR & LIDAR
38 Ion thruster controller
40 Power and thrust system controllers
42 Attitude sensors and controls
44 28 VDC charger and regulator
46 Bus health and status multiplexer and D/A converters
48 Attitude control thruster on/off control
50 Emergency blowdown thruster control
52 IOSTAR™ Direct Broadcast System

What is claimed is:
1. An apparatus comprising:
a boom means (11) for providing support;
a nuclear reactor means (19) for generating heat; said nuclear reactor means (19) being coupled to said boom means (11);

a payload protection means (20) for protecting a payload (15) from radiation; said payload protection means (20) being coupled to said nuclear reactor means (19);

a radiator means (16) for dissipating heat; said radiator means (16) being coupled to said nuclear reactor means (19);

an electric propulsion means (12) for supplying thrust; said electric propulsion means (12) being coupled to said nuclear reactor means (19);

a propellant tank means (13) for storing fuel for said electric propulsion means (12);

said propellant tank means (13) being coupled to said boom means (11); and a multiple-use grasping means (14) for interacting with a plurality of different objects and being configured to partially surround one of said plurality of different objects; said grasping means for engaging and grasping said object without the need for any preconfigured docking interface on said object; said grasping means (14) extending outwardly at one end away from said boom means (11); said grasping means (14) being coupled to said boom means (11), generally at one end of said boom means (11).

2. An apparatus as recited in claim 1, in which said nuclear reactor means (19) includes a Brayton Cycle energy converter.

3. An apparatus as recited in claim 1, in which said payload protection means (20) includes a recuperator.

4. An apparatus as recited in claim 3, in which said recuperator is employed as a gamma shield.

5. An apparatus as recited in claim 3, in which said recuperator is cooled by a thermoelectric cooler.

6. An apparatus as recited in claim 1, which may be controlled from an on-orbit controller.

7. An apparatus as recited in claim 1, further comprising a laser used for orbital debris removal.

8. An apparatus as recited in claim 1, which is used to produce propellant from an asteroid.

9. An apparatus as recited in claim 8, in which ice present on said asteroid is electrolyzed to form hydrogen and oxygen.

10. An apparatus as recited in claim 8, in which a carbonaceous material present on said asteroid is processed to form a storable propellant.

11. An apparatus as recited in claim 1, in which a propellant is produced from water launched into orbit from Earth.

12. An apparatus as recited in claim 1, in which a propellant is produced from a stable, storable material launched into orbit from Earth.

13. An apparatus as recited in claim 1, further comprising:

a conductor (21); said conductor (21) for generating an electrical current.

14. Apparatus as recited in claim 13, in which said conductor (21) is coupled to said boom (11).

15. An apparatus as recited in claim 13, in which said conductor (21) is coupled to said radiator (16).

16. An apparatus as recited in claim 13, in which said electrical current is consumed.

17. An apparatus as recited in claim 13, in which said electrical current is conveyed to another satellite.

18. An apparatus as recited in claim 13, in which an opposite electrical current is imparted into said conductor (21) to change the orbit of a satellite.

19. An apparatus as recited in claim 18, in which said opposite electrical current is used to deorbit a satellite.

20. An apparatus as recited in claim 13, further comprising:

a plasma contactor (23); said plasma contactor (23) being coupled to said conductor (21).

21. An apparatus as recited in claim 20, in which said plasma contactor (23) is a hollow cathode assembly.

* * * * *